Figure 1:
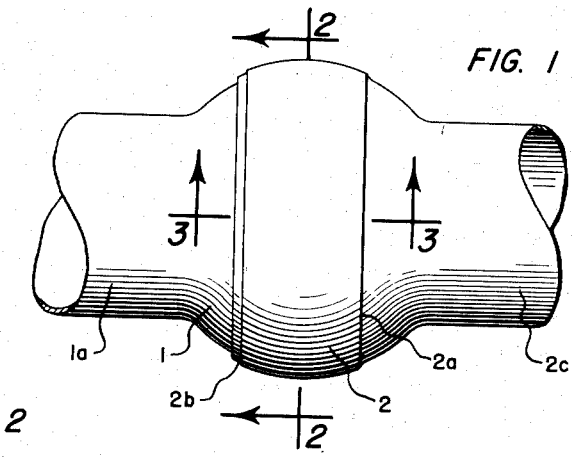

Oct. 27, 1953

W. G. HUBBELL 2,657,076

FLEXIBLE JOINT FOR TUBES

Filed May 19, 1950

INVENTOR.
WILSON G. HUBBELL
BY
Wm. H. Dean
AGENT

Patented Oct. 27, 1953

2,657,076

UNITED STATES PATENT OFFICE 2,657,076

FLEXIBLE JOINT FOR TUBES

Wilson G. Hubbell, San Diego, Calif., assignor to The Ryan Aeronautical Co., San Diego, Calif., a corporation of California Application May 19, 1950, Serial No. 163,013

4 Claims. (Cl. 285—91)

My invention relates to flexible joints for tubes, more particularly for flexible joints for use in connection with the exhaust systems of internal combustion engines, such as aircraft engines or the like, and the objects of my invention are:

First, to provide a flexible joint for tubes wherein a spheroid joint member is positioned internally of a spheroid socket and spaced therefrom, providing a space between the joint member and the socket in which resilient sealing rings are disposed which provide for intimate slidable bearing surfaces which permit movement of the socket relative to the joint, and concurrently seal gases from escaping through the joint;

Second, to provide a flexible joint for tubes which is very compact and light in weight;

Third, to provide a flexible joint for tubes which tends to operate at a relatively low temperature at its wearing surfaces, corresponding to the existing temperatures within the interior of the joint;

Fourth, to provide a flexible joint for tubes which may be made entirely of sheet metal, or a combination of thin walled tubes and sheet metal;

Fifth, to provide a flexible joint for tubes of this class having novel sealing ring retaining portions, which may be easily fabricated in connection with sheet metal spheroid joints and sockets;

Sixth, to provide a flexible joint for tubes of this class which is very simple and easy to assemble;

Seventh, to provide a flexible joint for tubes having a certain mechanical arrangement which provides for ease of assembly thereof, without undue attention to tolerances, which are automatically compensated for diametrically resilient sealing rings internally of the joint intermediate the joint member and the socket therefor;

Eighth, to provide a flexible joint for tubes in which resilient sealing rings, intermediate a spheroid socket member and a spheroid joint member tend to maintain the spheroid socket member and the spheroid joint member concentric with each other, due to resilient bearing of the sealing members at the middle of the socket and joint members, and spaced bearing contacts of the sealing members on the spheroid socket member and the joint member spaced from said middle portion;

Ninth, to provide a flexible joint for tubes of this class which tends to resist vibrational damage and wear, due to the disposition of resilient sealing rings intermediate the spheroid joint member and the spheroid socket spaced therefrom and surrounding the same; and Tenth, to provide a flexible joint for tubes of this class which is very simple and economical of construction, efficient in operation, and which will not readily deteriorate or get out of order.

Figures 2, 3, 4:
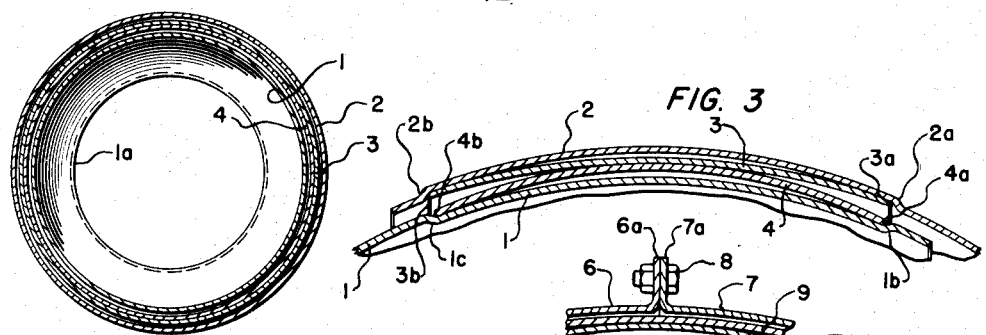
Figures 5, 6:
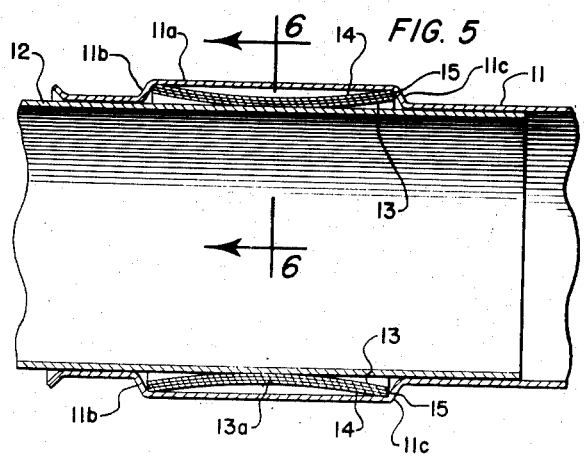
Figure 7:
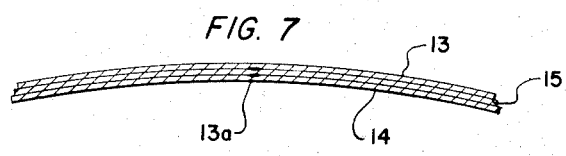

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a side elevational view of my flexible joint for tubes, showing the tubes in connection therewith fragmentarily; Fig. 2 is a transverse sectional view, taken from the line 2—2 of Fig. 1; Fig. 3 is an enlarged fragmentary sectional view, taken from the line 3—3 of Fig. 1; Fig. 4 is a sectional view similar to Fig. 3, showing a slight modification of the structure as shown in Fig. 1; Fig. 5 is a longitudinal sectional view of a modified form of my flexible joint for tubes; Fig. 6 is an enlarged fragmentary sectional view, taken from the line 6—6 of Fig. 5; and Fig. 7 is an enlarged longitudinal section of the sealing rings of the modified structure as shown in Fig. 5 of the drawings, and showing said sealing rings on substantially the same plane as shown in Fig. 5.

Similar characters of reference refer to similar parts and portions throughout the several views of the drawings.

The spheroid joint member 1, spheroid socket member 2, and the sealing rings 3 and 4, constitute the principal parts and portions of my flexible joint for tubes, as shown in Figs. 1 to 3 of the drawings.

The spheroid joint member 1 is preferably integral with a tubular structure 1a, and this spheroid joint member 1, as shown in Fig. 3 of the drawings, is provided with an annular recess portion in which the sealing ring 4 is positioned. Opposite ends of the recess are defined by the annular steps 1b and 1c, adjacent to which opposite ends of the annular sealing ring 4 are positioned. The annular sealing ring 4 is arcuate in longitudinal section, parallel to the axis of the tubular structure 1a, and the arcuate shape in longitudinal section of said sealing ring 4 is on a shorter radius than the spherical radius of the spheroid joint member 1. Thus, opposite ends 4a and 4b of the sealing ring 4 bear within the recess of the spheroid member 1, near the annular steps 1b and 1c, respectively, defining the fore and aft limits of said annular recess.

The spheroid socket member 2 is provided with annular step portions 2a and 2b, corresponding to the annular steps 1b and 1c in the spheroid joint member 1, providing an outwardly disposed spheroid recess, in which the sealing ring 3 is positioned. This sealing ring 3 is arcuate in longitudinal section, parallel to the axis of the tubular structure 2c, which is integral with the spheroid socket member 2. The radius of the longitudinal arcuate section of the sealing ring 3 is substantially longer than the radius of the outwardly disposed recess in the spheroid socket member 2, intermediate the annular steps 2a and 2b, providing clearance of the sealing ring 3 at the middle of the annular recess intermediate the annular steps 2a and 2b in the spheroid socket member 2.

The sealing rings 3 and 4, as shown in Fig. 3 of the drawings, resiliently bear against each other at their middle portions, providing resilient support of the spheroid socket surrounding the spheroid joint member in concentric relationship therewith. It will be noted that opposite ends 3a and 3b of the sealing ring 3 bear within the annular recess of the spheroid socket member 2, intermediate the annular steps 2a and 2b.

The operation of my flexible joint for tubes is substantially as follows:

When the spheroid joint member 1 and spheroid socket member 2 are in connection with the exhaust system of an internal combustion engine, such as an aircraft engine or the like, and these members are vibrating relative to each other and conducting hot exhaust gases, the sealing rings 3 and 4 provide a resilient cushion for the spheroid socket member 2 and the spheroid joint member 1 relative to each other, which minimizes the destructive pounding effect caused by said vibration at high temperatures. The separated relationship of the sealing rings 3 and 4, at their opposite ends, permits a certain heat exchange to the atmosphere, which tends to maintain these parts at a substantially lower temperature than the gas passing through the tubular structures 1a and 2c in connection with the spheroid joint member 1 and spheroid socket member 2. The resilient bearing of the sealing rings 3 and 4 against each other at their middle portions provides an effective seal for gas while opposite ends of each of the sealing rings 3 and 4, bearing in connection with the spheroid socket member 2 and the spheroid joint member 1, respectively, provides a complete seal against leakage of gases passing through the tubular structures 1a and 2c, hereinbefore described.

It will be noted that during the spheroid flexing of the spheroid joint member 1 relative to the spheroid socket 2, the ends 1b and 1c of the recess in the spheroid joint member 1 provide an abutment for opposite ends 4a and 4b of the sealing ring 4, preventing displacement thereof. The opposite ends 2a and 2b of the recess in the spheroid socket member 2 provide an abutment for opposite ends 3a and 3b of the sealing ring 3, preventing displacement thereof in a similar manner to that described in connection with the sealing ring 4. Thus, the sealing ring 3 is carried in unison with the spheroid socket member 2, while the sealing ring 4 is carried in unison with the spheroid joint member 1, during vibrational flexing of the spheroid joint member 1 relative to the spheroid socket member 2.

In the modification as shown in Fig. 4 of the drawings, the parts are designated as follows: the spheroid joint member 5, spheroid socket members 6 and 7, bolts 8, and the sealing rings 9 and 10.

It will be here noted that the spheroid joint member 5 is similar in structure to the spheroid joint member 1 hereinbefore described, and that the sealing rings 9 and 10 are similar to the hereinbefore described sealing rings 3 and 4. The spheroid socket members 6 and 7 are connected together by radial flange portions 6a and 7a, by means of the bolts 8, and these spheroid socket members 6 and 7, when connected together, form a socket which takes the place of the spheroid socket member 2, hereinbefore described.

It will be here noted that in the fabrication and assembly of the structure shown in Figs. 1 to 3 of the drawings, the spheroid socket member 2 is formed and capped over the sealing rings 3 and 4 on the outside of the spheroid joint member 1. In the modified structure as shown in Fig. 4, the assembly is made manually by assembling the spheroid socket members 6 and 7 by means of the bolts 8, around the sealing rings 9 and 10 on the outer side of the spheroid joint member 5.

In the modification as shown in Figs. 5, 6 and 7, the parts are designated as follows: tubes 11 and 12, and the sealing rings 13, 14 and 15.

In the construction of the modified form of my flexible joint for tubes, I have provided a tube 11, which is provided with an enlarged diameter annular portion 11a, in which the annular resilient sealing rings 13, 14 and 15 are disposed. These resilient sealing rings 13, 14 and 15 are annular and arcuate in longitudinal section, parallel to the axes of the tubes 11 and 12. The middle portion of these sealing rings 13, 14 and 15 are connected together by spot-welded portions 13a, and the middle portion of the innermost sealing ring, designated 13, bears on the outer annular wall of the tube 12, permitting axial slidable relationship of the tubes 11 and 12, which provides longitudinal adjustment of the tubes 11 and 12, which may be automatic in proportion to temperature changes and mechanical influences.

It will be noted that the step portions 11b and 11c, at opposite ends of the enlarged diameter portion 11a of the tube 11, provide an abutment for opposite ends of the resilient sealing rings 13, 14 and 15.

The operation of the modified structure as shown in Figs. 5, 6 and 7, is substantially as follows:

When hot gases under pressure are passing through the tubes 11 and 12, sealing thereof is accomplished by intimate resilient contact of the middle portion of the sealing ring 13 on the outer annular wall of the tube 12, and also contact of the opposite ends of the sealing ring 14 in the inside of the enlarged diameter portion 11a of the tube 11, adjacent the annular stepped abutments 11b and 11c.

Though I have shown and described a particular construction, combination and arrangement of parts and portions, and certain modifications, I do not wish to be limited to this particular construction, combination and arrangement, nor to the modifications, but desire to include in the scope of my invention the construction, combination and arrangement substantially as set forth in the appended claims.

Having thus described my invention, what I claim as new and desire to secure by Letters Patent is:

1. In a flexible joint for tubes, a spheroid joint member of hollow construction, having an annularly recessed spheroid portion in its outer side, a resilient annular flexible heat-resistant metal sealing ring having its opposite end portions bearing in said annularly recessed portion, a second sealing ring annular in form, and having its opposite ends spaced from the opposite ends of said first-mentioned sealing ring, and bearing against said first-mentioned sealing ring at the middle portion thereof, and a spheroid socket member surounding said sealing rings and said spheroid joint member, and provided with a diametrically enlarged recessed portion opposed to said annularly recessed portion in which said second-mentioned sealing ring is disposed.

2. In a flexible joint for tubes, a spheroid joint member of hollow construction, having an annularly recessed spheroid portion in its outer side, a resilient annular flexible metal sealing strap having its opposite end portions bearing in said annularly recessed portion, a second sealing strap annular in form, and having its opposite ends spaced from the opposite ends of said first-mentioned sealing strap, and bearing against said first-mentioned sealing strap at the middle portion thereof, and a spheroid socket member surrounding said sealing straps and said spheroid joint member, and provided with a diametrically enlarged recess portion opposed to said annularly recessed portion in which said second-mentioned sealing strap is disposed, opposite ends of said second-mentioned sealing strap engaging said spheroid socket member in said outwardly disposed increased diameter recess portion.

3. In a flexible joint for tubes, a spheroid joint member of hollow construction, having an annularly recessed spheroid portion in its outer side, a resilient annular flexible metal sealing ring having its opposite end portions bearing in said annularly recessed portion, a second sealing ring annular in form, and having its opposite ends spaced from the opposite ends of said first-mentioned sealing ring, and bearing against said first-mentioned sealing ring at the middle portion thereof, and a spheroid socket member surrounding said sealing rings and said spheroid joint member, and provided with a diametrically enlarged outwardly disposed recess portion in which said second-mentioned sealing ring is disposed, opposite ends of said second-mentioned sealing ring engaging said spheroid socket member in said outwardly disposed increased diameter recess portion, said spheroid socket member maintained in closely spaced relationship to said spheroid joint member by resilient tendencies of said sealing rings therebetween bearing against each other.

4. In a flexible joint for tubes, a spheroid joint member of hollow construction, having a diametrically recessed spheroid portion in its outer side, a resilient annular sealing ring having its opposite end portions bearing in said diametrically recessed portion, a second sealing ring annular in form, and having its opposite ends spaced from the opposite ends of said first-mentioned sealing ring, and bearing against said first-mentioned sealing ring at the middle portion thereof, and a spheroid socket member surrounding said sealing rings and said spheroid joint member, and provided with a diametrically enlarged outwardly disposed recess portion in which said second-mentioned sealing ring is disposed, opposite ends of said second-mentioned sealing ring engaging said spheroid socket member in said outwardly disposed increased diameter recess portion, said spheroid socket member maintained in spaced relationship to said spheroid joint member by resilient tendencies of said sealing rings therebetween bearing against each other, said spheroid socket member composed of two portions having outwardly extending flanges, secured together at the middle of said spheroid socket member, and bolts for securing said outwardly disposed flanges together.

WILSON G. HUBBELL.

References Cited in the file of this patent

UNITED STATES PATENTS

| Number | Name | Date |
|---|---|---|
| 26,015 | Clay | Nov. 8, 1859 |
| 56,448 | Reed | July 17, 1866 |
| 153,511 | Yocum | July 28, 1874 |
| 169,208 | Wadleigh | Oct. 26, 1875 |
| 2,117,152 | Crosti | May 10, 1938 |
| 2,280,728 | Streib | Apr. 21, 1942 |
| 2,381,426 | Allen et al. | Aug. 7, 1945 |
| 2,417,250 | Harvey | Mar. 11, 1947 |
| 2,475,834 | Harvey | July 12, 1949 |

FOREIGN PATENTS

| Number | Country | Date |
|---|---|---|
| 116,140 | France | Dec. 22, 1876 |
| 524,935 | Great Britain | Aug. 19, 1940 |